United States Patent Office 3,487,151
Patented Dec. 30, 1969

3,487,151
CERTAIN AZIRIDINYL-PHOSPHORUS CONTAINING ESTERS AS CHEMOSTERILANTS FOR HOUSEFLIES
Harry Tilles, El Cerrito, Calif., and David J. Broadbent, Racine, Wis., assignors to Stauffer Chemical Company, New York, N.Y., a corporation of Delaware
No Drawing. Continuation-in-part of application Ser. No. 439,445, Mar. 12, 1965. This application Dec. 13, 1967, Ser. No. 690,072
Int. Cl. A01n 9/36
U.S. Cl. 424—200                                24 Claims

ABSTRACT OF THE DISCLOSURE

This invention pertains to the utility of certain aziridinyl-phosphorus containing esters as chemosterilants, especially against houseflies. The compounds correspond to the formula

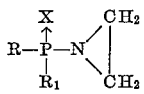

in which R is lower alkyl, lower monoalkylamino, lower dialkylamino, phenyl, phenoxy, lower alkoxy, lower alkoxy, lower alkoxy-lower alkyl, lower alkenylamino, cyclohexylamino, or lower alkylenimino, $R_1$ is aziridinyl, lower dialkylamino and lower alkoxy and X is oxygen or sulfur. Representative compounds are P,P-bis(1-aziridinyl) - N-(3 - methoxypropyl) - phosphinothioic amide, P,P-bis(1 - aziridinyl)-N-methylphosphinothioic amide, P,P-bis(1-aziridinyl)-ethylphosphine sulfide and P,P-bis(1-aziridinyl)-phenylphosphine oxide.

---

This application is a continuation-in-part of copending application U.S. Ser. No. 439,445, filed Mar. 12, 1965 now abandoned.

This invention relates to the use of certain organic compounds for the control of insects. More specifically, the invention relates to the use as chemosterilants of compounds of the general formula

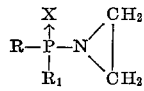

wherein R is a member selected from the group consisting of lower alkyl, lower alkylamino, lower dialkylamino, phenyl, phenoxy, lower alkoxy-lower-alkyl, lower alkenylamino, cyclohexylamino, alkylenimine containing up to 6 carbon atoms in the alkylene chain, $R_1$ is a member selected from the group consisting of aziridinyl, lower dialkylamino and lower alkoxy groups, and X is selected from the group consisting of oxygen and sulfur.

As employed in this specification the terms lower alkyl, lower monoalkylamino and lower alkoxy preferably include those members of the groups containing from 1 to 6 carbon atoms, inclusive. Examples of such members are methyl, ethyl, n-propyl, n-butyl, iso-butyl, n-amyl, and n-hexyl; monomethylamino monoethylamino, mono-n-propylamino mono-n-butylamino, mono-iso-butylamino, mono-n-amylamino and mono-n-hexylamino; N,N-dimethylamino, N,N-diethylamino and N,N-di-n-propylamino; methoxy, ethoxy, n-propoxy, n-butoxy, iso-butoxy n-amoxy and n-hexoxy. The term lower alkoxy-lower alkyl preferably includes those members of the group containing 2 to 8 carbon atoms, inclusive. Examples of such members are: methoxymethyl, ethoxymethyl, n-propoxyethyl, ethoxyethyl, methoxypropyl, n-propoxymethyl, iso-propoxy-n-propyl, iso-butoxy-methyl, iso-butoxyethyl, iso-butoxy-n-butyl, iso-pentoxymethyl, iso-pentoxyethyl, n-hexoxymethyl, and ethoxyhexyl. The term lower alkenyl-amino preferably includes those members of the group containing 2 to 4 carbon atoms, inclusive. Examples of such members are: ethylenamino, 1-propenamino, 2-propenamino, 1-butenamino, 2-butenamino and 3-butenamino.

The compounds of the present invention can be prepared by the reaction of the appropriate phosphorus containing mono- or di-chloride with one or two equivalents of ethyleneimine in the presence of a hydrogen chloride acceptor in accordance with the following formulas:

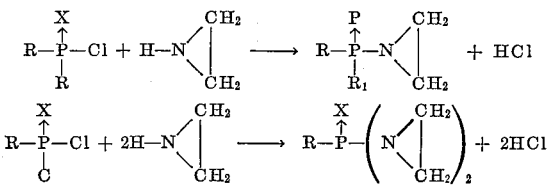

in which R, $R_1$ and X are as previously defined. The reaction is preferably conducted in the presence of an inert organic solvent, such as benzene, toluene and the like. Examples of operable phosphorus-containing compounds are substituted phosphorothioic dichlorides, monochloro phosphates, dichlorophosphates, monochlorothio phosphates, phosphoramidic dichlorides, phosphoroamidothioic chlorides and the like.

It has been found that the compounds herein contemplated display excellent activity in the control of insect populations. Not only are the compounds of value as lethal insecticides, but they exhibit a unique property of rendering the insects sterile, that is, control or eradication becomes possible by causing sexual sterility in the insect. Thereby, propagation of the species is severely inhibited.

In general, according to this invention the compounds have been found to control insects by killing, as well as by causing sexual sterility therein. The compounds for effective control may be applied at varying rates either incorporated in a food supply or by direct contact with the insects. A suitable sterilant may limit populations of insects either by sterilizing or by killing, depending upon the rate of dosage used.

The compounds of the present invention may be prepared in accordance with the following non-limiting examples.

EXAMPLE I (COMPOUND 1)

Preparation of P,P-bis(1-aziridinyl)-N-methylphosphinothioic amide

A 200 cc. 3-necked flask was provided with stirrer, thermometer, addition funnel and gas exit tube. The entire apparatus was flushed out with argon.

A solution of 9.4 g. (0.092 mole) of triethylamine and 4.0 g. (0.092 mole) of ethyleneimine in 40 cc. of dry benzene was charged to the flask and cooled to 0° C. A solution of 6.6 g. (0.040 mole) of methylphosphoramidothioic dichloride in 40 cc. of dry benzene was then added dropwise at 4° C. to the amine solution with cooling. After completion of the addition, the cooling bath was removed and the reaction mixture was allowed to warm to room temperature. The mixture was heated to 35–40° and maintained at that temperature for 1 hour. The reaction mixture was then filtered and the triethylamine hydrochloride solid was washed with seven 5 cc. portions of benzene. After drying, the triethylamine hydrochloride weighed 10.7 g. (97.3% yield).

The combined benzene filtrate was concentrated on a rotary evaporator under reduced pressure at a temperature not exceeding 80° C. The residual liquid which was obtained was chilled in a freezer overnight and crystallized. There was obtained 6.7 g. (94.4% yield) of P,P- bis(1-aziridinyl)-N-methylphosphinothioic amide, M.P. 70.0–71.5° C.

5.5 g. of the above product was heated to boiling with 10 cc. of anhydrous ethyl ether and 10 cc. of dry n-hexane. The hot solution was decanted from a small amount of brown gummy residue. On cooling, the product crystallized out. After standing at room temperature for several hours, the crystals were filtered off and dried in the vacuum oven at 55–60° for about 45 minutes. There was obtained 4.7 g. (85.4% recovery) of purified product, M.P. 71.0–72.5° C.

EXAMPLE II (COMPOUND 2)

The general procedure of Example I was followed except a solution of 9.4 g. (0.092 mole) of triethylamine and 4.0 g. (0.092 mole) of ethyleneimine in 40 cc. of dry benzene was added to a solution of 5.9 g. (0.040 mole) of methylphosphoramidic dichloride in 40 cc. of dry benzene. There was obtained 6.3 g. (98.5% yield) of crude product, M.P. 99.0–103.5° C. This product (5.9 g.) was recrystallized from a solution of 30 cc. cyclohexane and 15 cc. of dry benzene. There was then obtained 5.1 g. (86.4% recovery) of purified N-methyl-P,P-bis(1-aziridinyl) phosphinic amide, M.P. 104.5–106.0° C.

*Analysis.*—Calcd. for $C_5H_{12}N_3PO$: C, 37.27; H, 7.51; N, 26.08; P, 19.22. Found: C, 37.14; H, 7.25; N, 25.36; P, 19.20.

EXAMPLE III (COMPOUND 3)

The general procedure of Example II was followed except that 9.4 g. (0.092 mole) of triethylamine, 4.0 g. (0.092 mole) of ethyleneimine and 6.5 g. (0.04 moles) of dimethylphosphoramidic dichloride were employed. There was obtained 7.0 g. (100% yield) of N,N-dimethyl-P,P-bis(1-aziridinyl) phosphinic amide, $n_D^{30}$ 1.4778 having an aziridine assay of 96.5%.

*Analysis.*—Calcd. for $C_6H_{14}N_3OP$: C, 41.14; H, 8.06; N, 23.99; P, 17.68. Found: C, 41.05; H, 7.91; N, 23.87; P, 17.71.

5.0 g. of this product was molecular-distilled through a falling film still at a temperature of 96° and pressure of 80 microns. 4.7 g. of product was recovered which had an aziridine assay of 98.8% $n_D^{30}$ 1.4755. The product is hydroscopic.

EXAMPLE IV (COMPOUND 4)

The general procedure of Example II was followed except that 9.4 g. (0.092 mole) of triethylamine, 4.0 g. (0.092 mole) of ethyleneimine and 7.1 g. (0.040 mole) of dimethylphosphoramidothioic dichloride were employed. There was obtained 7.8 g. of crude product. This product was filtered from a small amount of solid and was molecular-distilled through a falling film still at 100° C. (80 microns). There was obtained 4.3 g. (56.5% yield) of N,N - dimethyl - P,P - bis(1-aziridinyl)phosphinothioic amide, $n_D^{30}$ 1.5273 having an aziridine assay of 100%.

*Analysis.*—Calcd. for $C_6H_{14}N_3PS$: C, 37.68; H, 7.38; S, 16.77. Found: C, 37.92; H, 7.16; S, 16.53.

EXAMPLE V (COMPOUND 5)

The general procedure of Example II was followed except that a solution of 2.6 g. (0.060 mole) of ethyleneimine and 6.6 g. (0.065 mole) of triethylamine in 40 cc. of dry benzene was added ot a solution of 8.6 g. (0.050 mole) of P-ethyl-N,N-dimethylphosphonamidothioic chloride in 40 cc. of dry benzene at 20–23°. There was obtained 9.0 g. of crude product. This product was molecular-distilled through a falling film still at 100° (80 microns). There was obtained 8.1 g. (93.0% yield) of P-ethyl-P-(1-aziridinyl)-N,N-dimethylphosphinothioic amide, $n_D^{30}$ 1.5175 having an aziridine assay of 100%.

*Analysis.*—Calcd. for $C_6H_{15}N_2PS$: C, 40.43; H, 8.48; N, 15.72; S, 17.99. Found: C, 40.63; H, 8.49; N, 15.85; S, 17.85.

EXAMPLE VI (COMPOUND 6)

The general procedure of Example I was followed except that a solution of 16.3 g. (0.10 mole) of ethylphosphonothioic dichloride in 100 cc. of dry benzene was added to a solution of 9.9 g. (0.23 mole) of ethyleneimine and 23.2 g. (0.23 mole) of triethylamine in 100 cc. of benzene. There was obtained 18.0 g. of crude product. This product was molecular-distilled through a falling film still at 88° (50 microns). There was obtained 15.2 g. (86.5% yield) of bis(1-aziridinyl)ethylphosphine sulfide, $n_D^{30}$ 1.5365 having an aziridine assay of 99.1%.

*Analysis.*—Calcd. for $C_6H_{13}N_2PS$: C, 40.89; H, 7.44; N, 15.90; S, 18.20. Found: C, 41.18; H, 7.22; N, 15.54; S, 18.02.

EXAMPLE VII (COMPOUND 7)

The general procedure of Example I was followed except that a solution of 19.5 g. (0.10 mole) of phenylphosphonic dichloride in 100 cc. of dry benzene was added to a solution of 9.9 g. (0.23 mole) of ethyleneimine and 25.2 g. (0.25 mole) of triethylamine in 100 cc. of benzene. There was obtained 20.6 g. (99.1% yield) of crude bis (1-aziridinyl) phenylphosphine oxide. This product was an extremely hydroscopic and deliquescent solid whose melting point could not be obtained. In order to redry it, it was treated with 250 cc. of reagent benzene and filtered from a small amount of flocculent solid. The benzene was then evaporated under reduced pressure. The residual solid weighed 19.9 g. This was dissolved in reagent acetone to make a total volume of 199 cc. of solution. This product was analyzed for nitrogen as an acetone solution of the above strength.

*Analysis.*—Calcd. for $C_{10}H_{13}N_2OP$: N, 13.46. Found: N, 12.61. It had an aziridine assay of 93.1%.

EXAMPLE VIII (COMPOUND 8)

The general procedure of Example I was followed except that a solution of 21.1 g. (0.10 mole) of phenylphosphonothioic dichloride in 100 cc. of dry benzene was added to a solution of 9.9 g. (0.23 mole) of ethyleimine and 25.2 g. (0.25 mole) of triethylamine in 100 cc. benzene. There was obtained 21.7 g. of crude product, M.P. 96.5–104.0° C. This was recrystallized from 152 cc. of cyclohexane. There was now obtained 16.1 g. (71.9% yield) of bis(1-aziridinyl)phenylphosphine sulfide, M.P. 104.0–105.3° C. having an aziridine assay of 101%.

*Analysis.*—Calcd. for $C_{10}H_{13}N_2PS$: C, 53.56; H, 5.84; N, 12.49; S, 14.30. Found: C, 53.37; H, 5.60; N, 12.61; S, 14.44.

EXAMPLE IX (COMPOUND 9)

The general procedure of Example I was followed except that a solution of 21.1 g. (0.10 mole) of phenyl dichlorophosphate in 100 cc. of dry benzene was added to a solution of 9.9 g. (0.23 mole) of ethyleneimine and 25.2 g. (0.25 mole) of triethylamine in 100 cc. of benzene. There was obtained 21.8 g. of phenyl bis(1-aziridinyl) phosphinate, $n_D^{30}$ 1.5360, having an aziridine assay of 93.8%.

*Analysis.*—Calcd. for $C_{10}H_{13}N_2O_2P$: C, 53.57; H, 5.84; N, 12.50. Found: C, 53.81; H, 6.05; N, 12.21.

EXAMPLE X (COMPOUND 10)

The general procedure of Example I was followed except that a solution of 17.3 g. (0.10 mole) of diethyl chlorophosphate in 100 cc. of dry bezene was added to a solution of 5.0 g. (0.115 mole) of ethyleneimine and 12.6 g. (0.125 mole) of triethylamine in 100 cc. of benzene. There was obtained 21.8 g. of phenyl bis(1-aziridinyl) molecular-distilled through a falling film still at 103° (70 microns). There was obtained 12.0 g. (67.0%) of diethyl (1-aziridinyl)phosphonate, $n_D^{30}$ 1.4326, having an aziridine assay of 100%.

*Analysis.*—Calcd. for $C_6H_{14}NO_3P$: C, 40.22; H, 7.88; N, 7.82. Found: C, 40.46; H, 7.57; N, 7.49.

EXAMPLE XI (COMPOUND 11)

The general procedure of Example I was followed except that a solution of 18.9 g. (0.10 mole) of diethyl chlorothiophosphate in 100 cc. of dry benzene was added to a solution of 5.0 g. (0.115 mole) of ethyleneimine and 12.6 g. (0.125 mole) of triethylamine in 100 cc. of benzene. There was obtained 18.8 g. (96.4% yield) of O,O-diethyl-(1-aziridinyl)phosphonothioate, $n_D^{30}$ 1.4798, having an aziridine assay of 96.4%.

*Analysis.*—Calcd. for $C_6H_{14}NO_2PS$: C, 36.91; H, 7.23; N, 7.18; S, 16.42. Found: C, 37.22; H, 6.96; N, 6.85; S, 16.52.

EXAMPLE XII (COMPOUND 12)

The general procedure of Example I was followed except that a solution of 16.1 g. (0.10 mole) of dimethyl chlorothiophosphate in 100 cc. of dry benzene was added to a solution of 5.0 g. (0.115 mole) of ethyleneimine and 12.6 g. (0.125 mole) of triethylamine in 100 cc. of benzene. There was obtained 16.7 g. of crude product which was molecular-distilled through a falling film still at 103° (200 microns). There was then obtained 14.2 g. (85% yield) of O,O-dimethyl-(1-aziridinyl)phosphorothioate, $n_D^{30}$ 1.4923 having an aziridine assay of 99.8%.

*Analysis.*—Calcd. for $C_4H_{10}NO_2PS$: C, 28.74; H, 6.03: N, 8.38; S, 19.18. Found: C, 28.86; H, 6.20; N, 8.22; S, 19.42.

EXAMPLE XIII (COMPOUND 13)

The general procedure of Example I was followed except that a solution of 21.7 g. (0.10 mole) of dipropyl chlorothiophosphate in 100 cc. of dry benzene was added to a solution of 5.0 g. (0.115 mole) of ethyleneimine and 12.6 g. (0.125 mole) of triethylamine in 100 cc. of benzene. There was obtained 21.4 g. of crude prodlct which was molecular-distilled through a falling film still at 104° (30 microns). There was obtained 19.2 g. (86.1% yield) of O,O-dipropyl-(1-aziridinyl)phosphonothioate, $n_D^{30}$ 1.4750 having an aziridine assay of 99.3%.

*Analysis.*—Calcd. for $C_8H_{18}NO_2PS$: N, 6.27. Found: N, 5.91.

EXAMPLE XIV (COMPOUND 14)

The general procedure of Example I was followed except that 16.2 g. (0.10 mole) of ethylphosphoramidic dichloride in 100 cc. of dry benzene was added to a solution of 9.9 g. (0.23 mole) of ethyleneimine and 25.2 g. (0.25 mole) of triethylamine in 100 cc. of benzene. There was obtained 17.6 g. of crude product which was recrystallized from 100 cc. of cyclohexane. There was then obtained 13.0 g. (74.3% yield) of N-ethyl-P,P-bis(1-aziridinyl)phosphinic amide, M.P. 60–63° C. This compound is extremely deliquescent which makes an accurate analysis difficult.

*Analysis.*—Calcd. for $C_6H_{14}N_3OP$: C, 41.14; H, 8.05; N, 23.99. Found: C, 39.84; H, 8.50; N, 23.27.

EXAMPLE XV (COMPOUND 15)

The general procedure of Example I was followed except that a solution of 14.9 g. of methylphosphorothioic dichloride in 100 cc. of dry benzene was added to a solution of 9.9 g. (0.23 mole) of ethyleneimine and 25.2 g. (0.25 mole) of triethylamine in 100 cc. of benzene. There was obtained 16.0 g. of crude product which was molecular-distilled through a falling film still at 105° (70 microns). There was obtained 13.5 g. (83.3% yield) of bis(1-aziridinyl)methylphosphine sulfide, $n_D^{30}$ 1.5439. Gas chromatographic analysis gave a purity of 99.0%.

*Analysis.*—Calcd. for $C_5H_{11}N_2PS$: C, 37.03; H, 6.84; N, 17.27; S, 19.77. Found: C, 37.32; H, 6.57; N, 17.02; S, 19.93.

EXAMPLE XVI (COMPOUND 16)

The general procedure of Example I was followed except that a solution of 8.7 g. (0.05 mole) of allylphosphoramidic dichloride in 25 cc. of dry benzene was added to a solution of 5.0 g. (0.115 mole) of ethyleneimine and 12.6 g. (0.125 mole) of triethylamine in 175 cc. of benzene. There was obtained 9.6 g. (102% yield) of crude N - allyl - P,P-bis(1-aziridinyl)phosphinic amide, $n_D^{30}$ 1.4974. Gas chromatographic analysis showed a purity of 83.1 area percent.

*Analysis.*—Calcd. for $C_7H_{14}N_3OP$: C, 44.92; H, 7.54; N, 22.45. Found: C, 46.29; H, 7.98; N, 20.04.

EXAMPLE XVII (COMPOUND 17)

The general procedure of Example I was followed except that a solution of 20.2 g. (0.10 mole) of pentamethylenephosphoramidic dichloride in 100 cc. of dry benzene was added to a solution of 9.9 g. (0.23 mole) of ethyleneimine and 25.2 g. (0.25 mole) of triethylamine in 100 cc. of benzene. There was obtained 22.9 g. of crude product, which was molecular-distilled through a falling film still at 58° (60 microns) to give 14.1 g. (69.1% yield) of N,N-pentamethylene-P,P-bis(1-aziridinyl)phosphinic amide, $n_D^{30}$ 1.5001. Gas chromatographic analysis gave a purity of 99.9 area percent.

*Analysis.*—Calcd. for $C_9H_{18}N_3OP$: N, 19.52. Found: N, 18.87.

EXAMPLE XVIII (COMPOUND 18)

The general procedure of Example I was followed except that 10.9 g. (0.05 mole) of pentamethylenephosphoramidothioic dichloride in 100 cc. of dry benzene was added to a solution of 5.0 g. (0.115 mole) of ethyleneimine and 12.6 g. (0.125 mole) of triethylamine in 100 cc. of benzene. There was obtained 11.8 g. of crude product which was molecular-distilled at 100° (30–40 microns) through a falling film still to give 6.0 g. (51.7% yield) of N,N-pentamethylene-P,P-bis(1-aziridinyl)phosphinothioic amide, $n_D^{30}$ 1.5423. Gas chromatographic analysis gave a purity of 96.3 area percent.

*Analysis.*—Calcd. for $C_9H_{18}N_3PS$: C, 46.53; H, 7.84; S, 13.86. Found: C, 46.54; H, 7.61; S, 13.58.

EXAMPLE XIX (COMPOUND 19)

The general procedure of Example I was followed except that 10.8 g. (0.05 mole) of cyclohexylphosphoramidic dichloride in 100 cc. of dry benzene was added to a solution of 5.0 g. (0.115 mole) of ethyleneimine and 12.6 g. (0.125 mole) of triethylamine in 100 cc. of benzene. There was obtained 11.5 g. of crude product which was recrystallized from 100 cc. of cyclohexane to give 6.3 g. (55.2% yield) of N-cyclohexyl-P,P-bis(1-aziridinyl)phosphinic amide, M.P. 103.0–105.0° C. Gas chromatographic analysis gave a purity of 99.9 area percent.

*Analysis.*—Calcd. for $C_{10}H_{20}N_3OP$: C, 52.39; H, 8.79. Found: C, 52.38; H, 8.52.

EXAMPLE XX (COMPOUND 20)

The general procedure of Example I was followed except that 33.4 g. (0.15 mole) of 3-methoxypropylphosphoramidothioic dichloride in 150 cc. of dry benzene was added to a solution of 14.9 g. (0.345 mole) of ethyleneimine and 34.8 g. (0.345 mole) of triethylamine in 150 cc. of benzene at a temperature of −8 to 16° C. There was obtained 35.0 g. of product, M.P. 68.0–69.7° C. This was recrystallized from a mixture of 125 cc. anhydrous ether and 100 cc. of dry cyclohexane to give 27.9 g. (79.8% yield) of P,P-bis(1-aziridinyl)-N-(3-methoxypropyl)-phosphinothioic amide, M.P. 69.0–70.5° C., having an aziridine assay of 100.2%.

*Analysis.*—Calcd. for $C_8H_{18}N_3OPS$: C, 40.84; H, 7.71; N, 17.86; P, 13.16; S, 13.63. Found: C, 40.98; H, 7.71; N, 17.64; P, 13.30; S, 13.67.

The following is a list of the compounds prepared following the aforedescribed procedures. Compound numbers have been assigned to each compound and are used throughout the balance of the application.

TABLE I

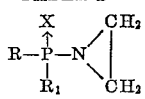

| Compound Number | Name | Molecular Formula | R | $R_1$ | X | Physical Constant |
|---|---|---|---|---|---|---|
| 1 | P,P-bis(1-aziridinyl)-N-methylphosphinothioic amide | $C_5H_{12}N_3PS$ | $CH_3NH$ | $N(CH_2)_2$ | S | [1] 71.0–72.5 |
| 2 | N-methyl-P,P-bis(1-aziridinyl)phosphinic amide | $C_5H_{12}N_3OP$ | $CH_3NH$ | $N(CH_2)_2$ | O | [1] 104.5–105.0 |
| 3 | N,N-dimethyl-P,P-bis(1-aziridinyl)phosphinic amide | $C_6H_{14}N_3OP$ | $(CH_3)_2N$ | $N(CH_2)_2$ | O | [2] 1.4755 |
| 4 | N,N-dimethyl-P,P-bis(aziridinyl)phosphinothioic amide | $C_6H_{14}N_3PS$ | $(CH_3)_2N$ | $N(CH_2)_2$ | S | [2] 1.5273 |
| 5 | P-ethyl-P-(1-aziridinyl)-N,N-dimethylphosphinothioic amide | $C_6H_{15}N_2PS$ | $C_2H_5$ | $(CH_3)_2N$ | S | [2] 1.5175 |
| 6 | Bis(1-aziridinyl)-ethylphosphine sulfide | $C_6H_{13}N_2PS$ | $C_2H_5$ | $N(CH_2)_2$ | S | [2] 1.5365 |
| 7 | Bis(1-aziridinyl)-phenylphosphine oxide | $C_{10}H_{13}N_2OP$ | $C_6H_5$ | $N(CH_2)_2$ | O | [3] |
| 8 | Bis(1-aziridinyl)-phenylphosphine sulfide | $C_{10}H_{13}N_2PS$ | $C_6H_5$ | $N(CH_2)_2$ | S | [1] 104.0–105.3 |
| 9 | Phenyl bis(1-aziridinyl)phosphinate | $C_{10}H_{13}N_2O_2P$ | $C_6H_5O$ | $N(CH_2)_2$ | O | [2] 1.5360 |
| 10 | Diethyl 1-aziridinylphosphonate | $C_6H_{14}NO_3P$ | $C_2H_5O$ | $C_2H_5O$ | O | [2] 1.4326 |
| 11 | O,O-diethyl(1-aziridinyl)phosphonothioate | $C_4H_{10}NO_2PS$ | $C_2H_5O$ | $C_2H_5O$ | S | [2] 1.4923 |
| 12 | O,O-dimethyl(1-aziridinyl)phosphonothioate | $C_4H_{10}NO_2PS$ | $CH_3O$ | $CH_3O$ | S | [2] 1.4923 |
| 13 | O,O-dipropyl(1-aziridinyl)phosphonothioate | $C_8H_{18}NO_2PS$ | $C_3H_7O$ | $C_3H_7O$ | S | [2] 1.4750 |
| 14 | N-ethyl-P,P-bis(1-aziridinyl)phosphinic amide | $C_6H_{14}N_3OP$ | $C_2H_5NH$ | $N(CH_2)_2$ | O | [1] 60–63 |
| 15 | Bis(1-aziridinyl)methylphosphine sulfide | $C_5H_{11}N_2PS$ | $CH_3$ | $N(CH_2)_2$ | S | [2] 1.5439 |
| 16 | N-allyl-P,P-bis(1-aziridinyl)phosphinic amide | $C_7H_{14}N_3OP$ | $CH_2=CHCH_2-NH$ | $N(CH_2)_2$ | O | [2] 1.4974 |
| 17 | N,N-pentamethylene-P,P-bis(1-aziridinyl)phosphinic amide | $C_9H_{18}N_3OP$ | N,N-pentamethylene | $N(CH_2)_2$ | O | [2] 1.5001 |
| 18 | N,N-pentamethylene-P,P-bis(1-aziridinyl)phosphinothioic amide | $C_9H_{18}N_3PS$ | Do. | $N(CH_2)_2$ | S | [2] 1.5423 |
| 19 | N-cyclohexyl-P,P-bis(1-aziridinyl)phosphinic amide | $C_{10}H_{20}N_3OP$ | $C_6H_{11}NH$ | $N(CH_2)_2$ | O | [1] 103.0–105.0 |
| 20 | P,P-bis(1-aziridinyl)-N-(3-methoxypropyl)phosphinothioic | $C_8H_{18}N_3OPS$ | $CH_3O(CH_2)_3$ | $N(CH_2)_2$ | S | [1] 69.0–70.5 |

[1] Melting point in ° C.  [2] Refractive index at 30° C.  [3] Melting point not obtainable.

As previously mentioned, the herein described compositions prepared in the above-described manner are biologically active compounds which are useful and valuable in controlling various pest organisms. The compounds of this invention were tested in the following manner.

Insecticide evaluation test.—The topical method of application was used to evaluate contact methods of insect control. The insect species Musca domestica (Linn.), the common housefly, was used in this test as a representative insect. Ten anesthetized female houseflies were treated topically on the meso-thorax using a self-filling one lambda pipet. The candidate compounds were dissolved in acetone containing 0.002 percent peanut oil. After 48 hours the percent mortality of the treated houseflies was recorded and the LD-50 value was calculated using well-known procedures. These values are given in Table II in the column HF.

Sterilant evaluation test.—Using the same species of houseflies, the compounds of the present invention were tested according to the instant test procedure in order to evaluate sterilant methods of insect control. One hundred newly emerged adult houseflies of both sexes were allowed to feed on a 1% concentration of the candidate compounds mixed into one teaspoon of granulated sugar. After 3 days of continuous feeding on the treated diet, the houseflies were maintained for four days on one tablespoon of untreated diet consisting of 6 parts powdered milk, 6 parts granulated sugar and one part powdered egg white.

TABLE II

| Compound Number | Compound Name | Molecular Formula | Contact Activity LD-50 (mg./25 ♂ flies) | Sterilant Activity SC-90 (percent) |
|---|---|---|---|---|
| 1 | P,P-bis(1-aziridinyl)-N-methylphosphinothioic amide | $C_5H_{12}N_3PS$ | 25 | 0.03 |
| 2 | N-methyl-P,P-bis(1-aziridinyl)phosphinic amide | $C_5H_{12}N_3PO$ | [1] 100 | 0.01 |
| 3 | N,N-dimethyl-P,P-bis(1-aziridinyl)phosphinic amide | $C_6H_{14}N_3OP$ | [1] 100 | 0.05 |
| 4 | N,N-dimethyl-P,P-bis(1-aziridinyl)phosphinothioic amide | $C_6H_{14}N_3PS$ | 8 | 0.1 |
| 5 | P-ethyl-P-(1-aziridinyl)N,N-dimethylphosphinothioic amide | $C_6H_{15}N_2PS$ | 8 | 0.5 |
| 6 | Bis(1-aziridinyl)ethylphosphine sulfide | $C_6H_{13}N_2PS$ | 8 | 0.08 |
| 7 | Bis(1-aziridinyl)phenylphosphine oxide | $C_{10}H_{13}N_2OP$ | 50 | 0.3 |
| 8 | Bis(1-aziridinyl)phenylphosphine sulfide | $C_{10}H_{13}N_2PS$ | 8 | 0.3 |
| 9 | Phenyl bis(1-aziridinyl)phosphinate | $C_{10}H_{13}N_2O_2P$ | 100 | 0.3 |
| 10 | Diethyl 1-aziridinylphosphonate | $C_6H_{14}NO_3P$ | 10 | >1.0 |
| 11 | O,O-diethyl(1-aziridinyl)phosphonothioate | $C_4H_{10}NO_2PS$ | 25 | 1.0 |
| 12 | O,O-diemthyl(1-aziridinyl)phosphonothioate | $C_4H_{10}NO_2PS$ | 15 | 0.8 |
| 13 | O,O-dipropyl(1-aziridinyl)phosphonothioate | $C_8H_{18}NO_2PS$ | 2 | 0.8 |
| 14 | N-ethyl-P,P-bis(1-aziridinyl)phosphinic amide | $C_6H_{14}N_3OP$ | [1] 100 | 0.03 |
| 15 | Bis(1-aziridinyl)methylphosphine sulfide | $C_5H_{11}N_2PS$ | 25 | 0.3 |
| 16 | N-allyl-P,P-bis(1-aziridinyl)phosphinic amide | $C_7H_{14}N_3OP$ | 75 | 0.01 |
| 17 | N,N-pentamethylene-P,P-bis(1-aziridinyl)phosphinic amide | $C_9H_{18}N_3OP$ | 75 | 0.3 |
| 18 | N,N-pentamethylene-P,P-bis(1-aziridinyl)phosphinothioic amide | $C_9H_{18}N_3OP$ | 25 | 0.08 |
| 19 | N-cyclohexyl-P,P-bis(1-aziridinyl)phosphinic amide | $C_{10}H_{20}N_3OP$ | 75 | 0.1 |
| 20 | P,P-bis(1-aziridinyl)-N-(3-methoxy-propyl)phosphinothioic amide | $C_8H_{18}N_3OPS$ | 50 | 0.05 |

[1] Partial control.

The houseflies were given an opportunity to oviposit on the seventh day following initial exposure to the candidate compounds. The egg clusters were collected from the oviposition medium and suspended in distilled water. Approximately 100 eggs were pipetted onto a 1-inch square piece of moist black cloth. The eggs were then placed upon fresh larval media and reared through to the succeeding generations.

The compounds were evaluated on the basis of percent egg viability, pupal formation, and the number of adult flies emerging from the pupal stage. The criterion for choosing compounds for further evaluation is the complete mortality of the parent flies, or an SC-90 value. The SC-90 value is the percent of compound in the diet which allowed only 10 percent of the total eggs deposited to complete the life cycle and emerge as adult flies. The SC-90 values are given in Table II under SC-90.

From these data it can be seen that these compounds are valuable insecticides. They are useful in the form of emulsions, non-aqueous solutions, wettable powders, vapors, dusts, dips, and the like, as may be best fitted to the particular utility. The mode of administration to a pest or its habitat are well known to those skilled in the art of insect control. The disclosure is not meant to limit the action of the compounds to one particular insect species or the mode of effect thereon.

Various changes and modifications may be made without departing from the spirit and scope of the invention described herein as will be apparent to those skilled in the art to which it pertains. It is accordingly intended that the present invention shall only be limited by the scope of the appended claims.

What is claimed is:

1. A method for controlling common houseflies by causing sexual sterility therein which comprises feeding said insects on an insect food supply having admixed therein an amount insufficient to cause lethal contact insecticidal activity but sufficient to cause a sterilizing action of a compound having the formula

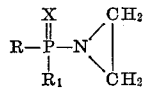

wherein R is a member selected from the group consisting of methylamino, ethylamino, dimethylamino, phenyl phenoxy, ethoxy, allylamino, cyclohexylamino, pentamethyleneimino, $R_1$ is a member selected from the group consisting of aziridinyl, and ethoxy and X is oxygen.

2. A method according to claim 1 in which R is phenyl, $R_1$ is aziridinyl and X is oxygen.

3. A method according to claim 1 in which R is ethoxy, $R_1$ is ethoxy and X is oxygen.

4. A method according to claim 1 in which R is methylamino, $R_1$ is aziridinyl and X is oxygen.

5. A method according to claim 1 in which R is dimethylamino, $R_1$ is aziridinyl and X is oxygen.

6. A method according to claim 1 in which R is phenoxy, $R_1$ is aziridinyl and X is oxygen.

7. A method according to claim 1 in which R is pentamethyleneimino, $R_1$ is aziridinyl and X is oxygen.

8. A common housefly chemosterilant composition comprising an insect food supply having admixed therein a compound having the formula

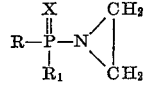

wherein R is a member selected from the group consisting of methylamino, ethylamino, dimethylamino, phenyl, phenoxy, ethoxy, allylamino, cyclohexylamino, pentamethyleneimino, $R_1$ is a member selected from the group consisting of aziridinyl, and ethoxy, and X is oxygen.

9. A composition according to claim 8 in which R is methylamino, $R_1$ is aziridinyl and X is oxygen.

10. A composition according to claim 8 in which R is dimethylamino, $R_1$ is aziridinyl and X is oxygen.

11. A composition according to claim 8 in which R is phenoxy, $R_1$ is aziridinyl and X is oxygen.

12. A composition according to claim 8 in which R is pentamethyleneimino, $R_1$ is aziridinyl and X is oxygen.

13. A composition according to claim 8 in which R is phenyl, $R_1$ is aziridinyl and X is oxygen.

14. A composition according to claim 8 in which R is ethoxy, $R_1$ is ethoxy and X is oxygen.

15. A method for controlling common houseflies by causing sexual sterility therein which comprises feeding said insects on an insect food supply having admixed therein an amount insufficient to cause lethal contact insecticidal activity but sufficient to cause a sterilizing action of a compound having the formula

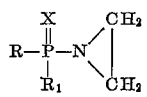

wherein R is a member selected from the group consisting of ethyl, methoxy, ethoxy and propoxy, $R_1$ is a member selected from the group consisting of dimethylamino, methoxy, ethoxy and propoxy and X is sulfur.

16. A method according to claim 15 in which R is ethyl, $R_1$ is dimethylamino and X is sulfur.

17. A method according to claim 15 in which R is ethoxy, $R_1$ is ethoxy and X is sulfur.

18. A method according to claim 15 in which R is methoxy, $R_1$ is methoxy and X is sulfur.

19. A method according to claim 15 in which R is propoxy, $R_1$ is propoxy and X is sulfur.

20. A common housefly chemosterilant composition comprising an insect food supply having admixed therein a compound having the formula

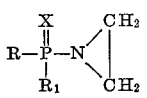

wherein R is a member selected from the group consisting of ethyl, methoxy, ethoxy and propoxy, $R_1$ is a member selected from the group consisting of dimethylamino, methoxy, ethoxy and propoxy and X is sulfur.

21. A composition according to claim 20 in which R is ethyl, $R_1$ is dimethylamino and X is sulfur.

22. A composition according to claim 20 in which R is ethoxy, $R_1$ is ethoxy and X is sulfur.

23. A composition according to claim 20 in which R is methoxy, $R_1$ is methoxy and X is sulfur.

24. A composition according to claim 20 in which R is propoxy, $R_1$ is propoxy and X is sulfur.

References Cited

UNITED STATES PATENTS

| | | | |
|---|---|---|---|
| 2,802,823 | 8/1957 | Tolkmith et al. | 260—239 |
| 2,802,824 | 8/1957 | Tolkmith et al. | 260—239 |
| 3,126,315 | 3/1964 | Woods et al. | 424—200 |
| 3,180,793 | 4/1965 | Ratz | 424—200 |
| 3,207,661 | 9/1965 | Curtis et al. | 424—200 |
| 3,264,178 | 8/1966 | Lesh et al. | 424—200 |
| 3,314,848 | 4/1967 | Ratz et al. | 424—200 |

OTHER REFERENCES

Borkovec, Residual Reviews, 6:87–103 (1964).

Goodridge et al.: Cancer Chemotherapy Report No. 26, pp. 413, 415, 422, 429, 431, 441, 442, January 1963.

SHEP K. ROSE, Primary Examiner

PO-1050
(5/69)

UNITED STATES PATENT OFFICE
CERTIFICATE OF CORRECTION

Patent No. 3,487,151　　　　　　　Dated Dec. 20, 1969

Inventor(s)　H. Tilles and D. J. Broadbent

It is certified that error appears in the above-identified patent and that said Letters Patent are hereby corrected as shown below:

Column 1 in Abstract, line 25 delete "lower alkoxy".

Column 2 Formula should read:

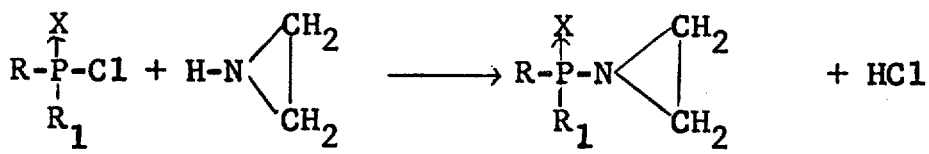

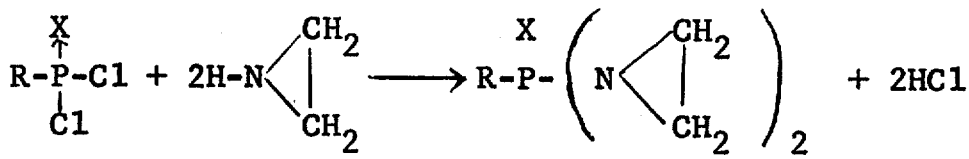

Column 3, Example III, last line "hydroscopic" should read --hygroscopic--.

Column 4, Example VII, line 24 "hydroscopic" should read --hygroscopic--.

Column 4, Example X, line 69 "21.8 g." should read --18.2 g.--

Column 4, Example X, line 69 "phenyl bis (1-aziridinyl)" should read -- crude product. This was--

Table I, Compound 2, Under Molecular Formula "$C_6H_{12}N_3OP$" should read --$C_5H_{12}N_3OP$--

Table II, Compound 8, Under Molecular Formula "$C_{10}R_{13}N_2PS$" should read --$C_{10}H_{13}N_2PS$--

Table II, Compound 13, under Contact Activity "2" should read --25--.

Signed and sealed this 13th day of October 1970.

(SEAL)
Attest:

Edward M. Fletcher, Jr.　　　　　　　　　　　WILLIAM E. SCHUYLER, JR.